United States Patent
Takahashi et al.

(10) Patent No.: US 11,084,351 B2
(45) Date of Patent: Aug. 10, 2021

(54) AUTOMOBILE REAR SUSPENSION STRUCTURE

(71) Applicants: MAZDA MOTOR CORPORATION, Hiroshima (JP); Y-Tec Corporation, Hiroshima (JP)

(72) Inventors: Hiroyuki Takahashi, Hiroshima (JP); Hideaki Kawaguchi, Hiroshima (JP); Masayuki Jobira, Hiroshima (JP); Yuya Yamanaka, Hiroshima (JP)

(73) Assignees: MAZDA MOTOR CORPORATION, Hiroshima (JP); Y-TEC CORPORATION, Hiroshima (JP)

( * ) Notice: Subject to any disclaimer, the term of this patent is extended or adjusted under 35 U.S.C. 154(b) by 65 days.

(21) Appl. No.: 16/497,579

(22) PCT Filed: Feb. 27, 2018

(86) PCT No.: PCT/JP2018/007135
§ 371 (c)(1),
(2) Date: Sep. 25, 2019

(87) PCT Pub. No.: WO2018/180114
PCT Pub. Date: Oct. 4, 2018

(65) Prior Publication Data
US 2021/0008949 A1 Jan. 14, 2021

(30) Foreign Application Priority Data

Mar. 27, 2017 (JP) .............................. JP2017-060618

(51) Int. Cl.
*B60G 21/05* (2006.01)
*B60G 7/00* (2006.01)
(Continued)

(52) U.S. Cl.
CPC ........... *B60G 21/051* (2013.01); *B60G 7/001* (2013.01); *B60B 35/025* (2013.01); *B60G 13/005* (2013.01);
(Continued)

(58) Field of Classification Search
CPC .............. B60G 21/051; B60G 2200/22; B60G 2206/14; B60G 2206/16; B60G 2204/41043; B60B 35/025
See application file for complete search history.

(56) References Cited

U.S. PATENT DOCUMENTS 4,165,099 A * 8/1979 Wagner ................ B60G 21/051
267/191
9,085,329 B2 * 7/2015 Komiya ................. B62D 21/11
(Continued)

FOREIGN PATENT DOCUMENTS

EP 2 669 103 A1 12/2013
EP 2669103 A1 * 12/2013 ........... B60G 21/051
(Continued)

OTHER PUBLICATIONS

International Search Report issued in PCT/JP2018/007135; dated Apr. 10, 2018.

*Primary Examiner* — Paul N Dickson
*Assistant Examiner* — Caitlin Anne Miller
(74) *Attorney, Agent, or Firm* — Studebaker & Brackett PC (57) ABSTRACT

The thickness of one of a pair of panels (an inner panel (20) and an outer panel (30)) of each trailing arm (12) is greater than the thickness of the other panel, and a rear wheel support unit (an axle unit (51)) configured to support each rear wheel is coupled to one of the pair of panels (the inner panel (20) and the outer panel (30)).

18 Claims, 7 Drawing Sheets

(51) Int. Cl.
*B60B 35/02* (2006.01)
*B60G 13/00* (2006.01)

(52) U.S. Cl.
CPC ...... *B60G 2200/22* (2013.01); *B60G 2202/24* (2013.01); *B60G 2206/16* (2013.01)

(56) References Cited

U.S. PATENT DOCUMENTS

| | | | |
|---|---|---|---|
| 9,421,838 B2* | 8/2016 | Morino | B60G 3/06 |
| 2008/0150249 A1* | 6/2008 | Murata | B60G 7/008 |
| | | | 280/124.128 |
| 2008/0202840 A1* | 8/2008 | Shimozato | B62M 7/12 |
| | | | 180/291 |
| 2011/0121533 A1* | 5/2011 | Lee | B60G 7/001 |
| | | | 280/124.128 |
| 2011/0298192 A1* | 12/2011 | Yu | B60G 7/001 |
| | | | 280/124.134 |

FOREIGN PATENT DOCUMENTS

| | | |
|---|---|---|
| JP | 2002-200908 A | 7/2002 |
| JP | 2009-051380 A | 3/2009 |
| JP | 2012-153346 A | 8/2012 |
| JP | 2015-224016 A | 12/2015 |
| JP | 2016-193682 A | 11/2016 |

* cited by examiner

LEFT ⟷ RIGHT

AUTOMOBILE REAR SUSPENSION STRUCTURE

TECHNICAL FIELD

The technique disclosed herein belongs to a technical field regarding an automobile rear suspension structure including a torsion beam type suspension having a pair of right and left trailing arms and a torsion beam coupling both trailing arms.

BACKGROUND ART

Typically, a torsion beam type suspension having a pair of right and left trailing arms extending in a vehicle longitudinal direction and each supporting right and left rear wheels and a torsion beam extending in a vehicle width direction and coupling both trailing arms has been known as an automobile rear suspension structure.

For example, Patent Document 1 discloses an automobile rear suspension structure including a pair of right and left trailing arms extending in a vehicle longitudinal direction and formed by pipes and a torsion beam coupling both trailing arms and configured such that a rear wheel is supported on a vehicle rear end portion of each trailing arm.

CITATION LIST

Patent Document

PATENT DOCUMENT 1: Japanese Unexamined Patent Publication No. 2015-224016

SUMMARY OF THE INVENTION

Technical Problem

In the automobile rear suspension structure including the torsion beam type suspension, a rear wheel support unit configured to support the rear wheel is, in some cases, provided at each trailing arm, and the rear wheel is supported on the trailing arm through the rear wheel support unit. In this case, for enhancing the support stiffness of the trailing arm for the rear wheel, the trailing arm may be thickened to enhance the support stiffness for the rear wheel. However, in a case where the trailing arm is formed by the pipe as in Patent Document 1, it is not easy to partially thicken the trailing arm. For this reason, the entirety of the trailing arm is inevitably thickened, leading to a problem that the weight of a rear portion of an automobile increases.

The technique disclosed herein has been made in view of such a point, and an object of the technique is to suppress an increase in the weight of a rear portion of an automobile while the support stiffness of a trailing arm for a rear wheel is enhanced as much as possible.

Solution to the Problem

For accomplishing the above-described object, the technique disclosed herein is targeted for an automobile rear suspension structure including a torsion beam type suspension having a pair of right and left trailing arms extending in a vehicle longitudinal direction and each supporting right and left rear wheels and a torsion beam extending in a vehicle width direction and coupling both trailing arms. Each trailing arm has a pair of panels having U-shaped sections and joined to each other in a state in which U-shaped openings face each other such that the sectional shape of each trailing arm forms a closed sectional shape, the thickness of one of the panels is greater than the thickness of the other one of the panels, and a rear wheel support unit configured to support each rear wheel is coupled to the one of the panels.

With the above-described configuration, the rear wheel support unit is coupled to the thicker panel, and therefore, the support stiffness of the trailing arm for the rear wheel can be enhanced. Moreover, the thinner panel forms a remaining portion, and therefore, an increase in the weight of the trailing arm can be suppressed. Thus, an increase in the weight of a rear portion of a vehicle can be suppressed while the support stiffness of the trailing arm for the rear wheel can be enhanced.

In one embodiment of the automobile rear suspension structure, the one of the panels forms a portion of a peripheral wall portion including at least an outer top portion in the vehicle width direction in at least the section of a rear portion of each trailing arm, and the rear wheel support unit configured to support each rear wheel is coupled to at least the outer top portion of the peripheral wall portion in the vehicle width direction in the section of the rear portion of each trailing arm.

That is, in the automobile rear suspension structure, the rear wheel support unit configured to support the rear wheel is, in some cases, provided at the rear portion of the trailing arm, and the rear wheel is supported on the rear portion of the trailing arm through the rear wheel support unit. The rear wheel is arranged on the outside in the vehicle width direction with respect to the trailing arm, and a rotary shaft of the rear wheel is normally positioned above the trailing arm. Thus, in the case of a configuration in which the rear wheel is supported on the rear portion of the trailing arm as described above, the strength and stiffness of the outer top portion of the peripheral wall portion in the vehicle width direction in the section of the rear portion of the trailing arm specifically needs to be enhanced for enhancing the support stiffness of the trailing arm for the rear wheel.

According to the above-described configuration, the thicker panel forms the portion of the peripheral wall portion including at least the outer top portion in the vehicle width direction in the section of the rear portion of the trailing arm, and the rear wheel support unit is coupled to at least the outer top portion of the peripheral wall portion in the vehicle width direction. Thus, the support stiffness of the trailing arm for the rear wheel can be enhanced. Accordingly, the effect of enhancing the support stiffness of the trailing arm for the rear wheel can be more properly provided.

In the above-described automobile rear suspension structure, the pair of panels may include an inner panel and an outer panel facing each other in the vehicle width direction. The thickness of the outer panel may be greater than the thickness of the inner panel. At the rear portion of the each trailing arm, a top portion of the outer panel may be wider in the vehicle width direction than a bottom portion of the outer panel. The rear wheel support unit coupled to each trailing arm may be coupled to the outer panel of each trailing arm.

With this configuration, a stiffness center in the section of the rear portion of the trailing arm can be positioned closer to the rear wheel support unit (a rear wheel axle) positioned on an outer top side of the trailing arm in the vehicle width direction. Thus, the support stiffness of the trailing arm for the rear wheel can be further enhanced with a simple configuration.

In the case of one embodiment described above, the closed sectional shape of the rear portion of each trailing arm may be a substantially rectangular shape, and at the rear portion of each trailing arm, a bottom portion of the inner panel may be wider in the vehicle width direction than a top portion of the inner panel.

With this configuration, the stiffness of the trailing arm in a top-to-bottom direction and the vehicle width direction can be enhanced while the stiffness center in the section of the rear portion of the trailing arm can be more effectively positioned closer to the rear wheel support unit.

In the above-described automobile rear suspension structure, the rear portion of each trailing arm may be wider in the vehicle width direction than a front portion of each trailing arm.

With this configuration, the rear portion of the trailing arm coupled to the rear wheel support unit is wider in the vehicle width direction than the front portion of the trailing arm, and therefore, the support stiffness of the trailing arm for the rear wheel can be further improved. Moreover, the front portion of the trailing arm can be positioned closer to the rear wheel by the decrement of the width of the front portion, and as a result, the trailing arm can be formed in a shape extending as straight as possible in the longitudinal direction. Thus, in combination with the wide rear portion of the trailing arm, the support stiffness of the entirety of the trailing arm for the rear wheel can be improved.

In the automobile rear suspension structure in which the closed sectional shape of the rear portion of each trailing arm is the substantially rectangular shape, the rear wheel support unit may include an attachment unit attached to each rear wheel and a bracket for supporting the attachment unit on the outer panel, and the bracket may be attached over the top portion of the outer panel and an outer portion of the outer panel in the vehicle width direction.

In another embodiment of the automobile rear suspension structure, the pair of panels include a top panel and a bottom panel facing each other in the top-to-bottom direction. The thickness of the top panel is greater than the thickness of the bottom panel. At the rear portion of each trailing arm, an outer portion of the top panel in the vehicle width direction is wider in the top-to-bottom direction than an inner portion of the top panel in the vehicle width direction. The rear wheel support unit coupled to each trailing arm is coupled to the top panel of each trailing arm.

In another embodiment described above, the closed sectional shape of the rear portion of each trailing arm may be a substantially rectangular shape. The rear wheel support unit may include an attachment unit attached to each rear wheel, and a bracket for supporting the attachment unit on the top panel. The bracket may be attached over a top portion of the top panel and the outer portion of the top panel in the vehicle width direction.

Advantages of the Invention

As described above, according to the automobile rear suspension structure disclosed herein, the thickness of one of the panels of each trailing arm is greater than the thickness of the other panel, and the rear wheel support unit configured to support each rear wheel is coupled to the one of the panels. Thus, an increase in the weight of the trailing arm and therefore an increase in the weight of the rear portion of the automobile can be suppressed while the support stiffness of the trailing arm for the rear wheel can be enhanced.

DESCRIPTION OF EMBODIMENTS

Hereinafter, an example embodiment will be described in detail with reference to the drawings.

Figure 1:
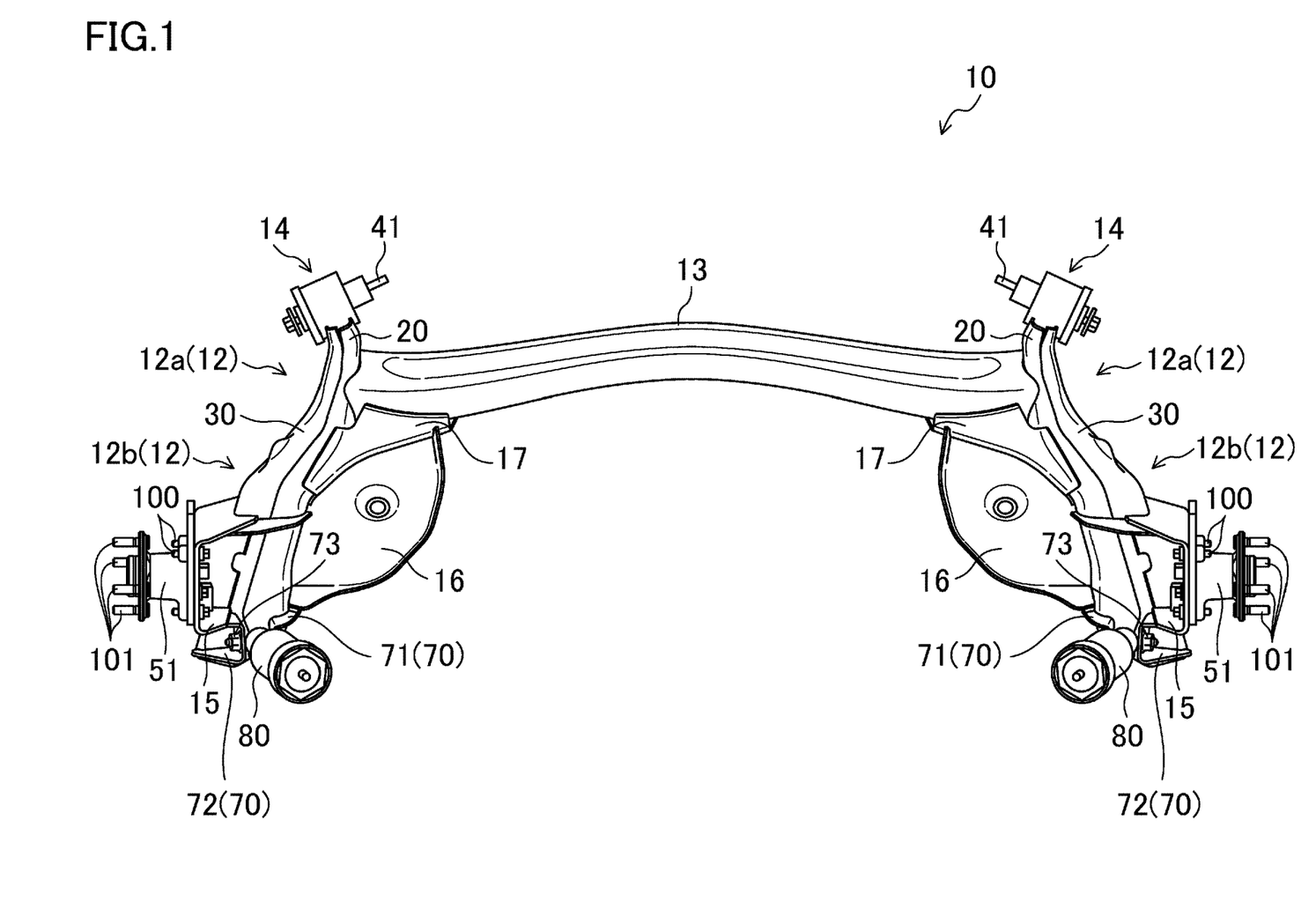
FIG. 1 is a plan view of a torsion beam type suspension arranged at a vehicle body rear portion of an automobile to which a rear suspension structure according to an example embodiment is applied.
Figure 2:
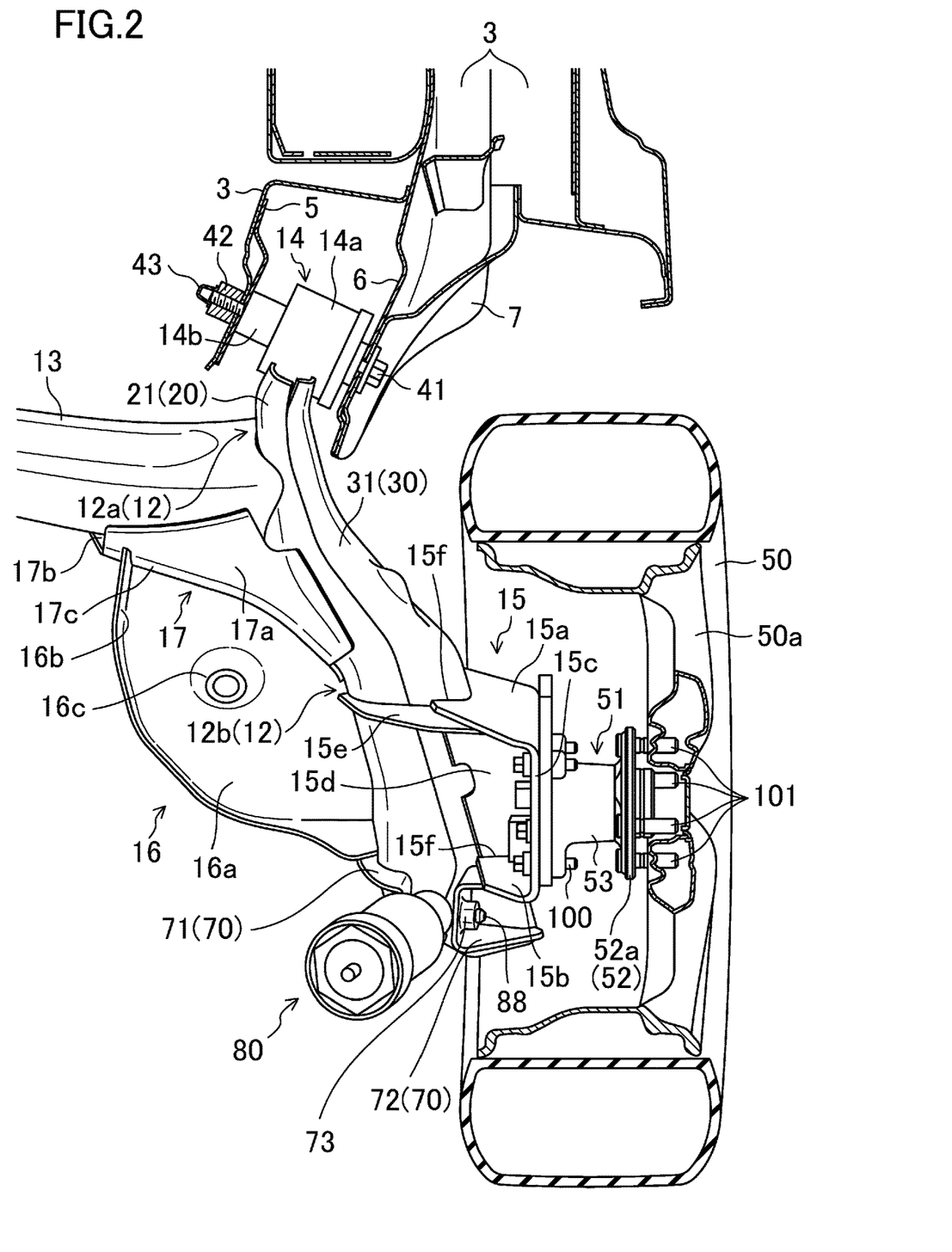
FIG. 2 is a sectional view of a right portion of the vehicle body rear portion of the automobile.

FIG. 1 illustrates a torsion beam type suspension 10 (hereinafter merely referred to as a "suspension 10") arranged at a vehicle body rear portion of an automobile (hereinafter referred to as a "vehicle") to which a rear suspension structure according to the present embodiment is applied, and FIG. 2 illustrates a right portion of the vehicle body rear portion of the vehicle. The vehicle is a front-engine front-drive type (FF type) vehicle, front wheels being drive wheels and rear wheels 50 (see FIG. 2) being driven wheels. Note that the above-described vehicle may be a four-wheel drive vehicle. Note that in description below, the front, rear, right, left, top, and bottom of the above-described vehicle will be merely referred to as "front," "rear," "right," "left," "top," and "bottom."

The suspension 10 arranged at the vehicle body rear portion of the above-described vehicle has a pair of right and left trailing arms 12 extending in a front-to-rear direction, and a torsion beam 13 extending in a vehicle width direction and coupling both trailing arms 12.

A suspension bush 14 for coupling the trailing arm 12 to a vehicle body to swing the trailing arm 12 in a top-to-bottom direction is fixed to a front end portion of each trailing arm 12.

A spring seat 16 is, through a corner portion reinforcement member 17, provided at each corner portion between each end portion of the torsion beam 13 in a longitudinal direction thereof on a rear side with respect to the torsion beam 13 and each of the right and left trailing arms 12 in a pair. A bottom end of a suspension coil spring (not shown in the figure) is attached to each spring seat 16. A top end of the coil spring is attached to the vehicle body.

A damper 80 for absorbing a top-to-bottom load transmitted from a road surface through the rear wheel 50 is, through a damper bracket 70, attached to a rear portion of each trailing arm 12 with respect to the spring seat 16.

Moreover, at the substantially same position as that of the spring seat 16 at an intermediate portion of each trailing arm 12 in the front-to-rear direction, an axle bracket 15 and an axle unit 51 forming a rear wheel support unit for supporting the rear wheel 50 are provided to protrude outward in the vehicle width direction.

Hereinafter, detailed configurations of the trailing arm 12 and components (e.g., the damper bracket 70) attached to the trailing arm 12 will be described. Note that the rear suspension structure according to the present embodiment is configured symmetrically in a right-to-left direction. Thus, configurations of the right trailing arm 12 and the components attached to the right trailing arm 12 will be mainly described below, and, e.g., detailed description of the left trailing arm 12 will be omitted.

First, the trailing arm 12 (indicating the right trailing arm 12) will be described.

As illustrated in FIG. 2, a front portion 12a of the trailing arm 12 is in a curved shape raised toward the left side (i.e., inward in the vehicle width direction) as viewed in plane to avoid the rear wheel 50. Specifically, the front portion 12a of the trailing arm 12 is curved such that the intermediate portion thereof in the front-to-rear direction is positioned on the leftmost side and the front portion 12a is positioned rightward as extending from the intermediate portion toward a front end of the front portion 12a and a rear end of the front portion 12a. Moreover, as illustrated in FIG. 2, the front portion 12a is configured such that a rear end portion of the front portion 12a is positioned on the right side with respect to the front end portion of the front portion 12a. As illustrated in FIG. 2, a rear portion 12b of the trailing arm 12 is in a shape inclined to the right side as extending toward the rear side.

As illustrated in FIG. 2, the front portion 12a of the trailing arm 12 has such a shape that the width in the vehicle width direction gradually increases from the front end of the front portion 12a toward the rear end of the front portion 12a. On the other hand, the rear portion 12b of the trailing arm 12 has such a shape that the rear portion 12b extends from a front end of the rear portion 12b toward the rear side of the rear portion 12b in a state in which the width in the vehicle width direction is substantially constant and the width in the vehicle width direction is greater at a portion (a portion coupled to the damper bracket 70) in the vicinity of a rear end of the rear portion 12b than at other portions of the rear portion 12b. Thus, the rear portion 12b of the trailing arm 12 is wider in the vehicle width direction than the front portion 12a of the trailing arm 12.

As illustrated in FIGS. 1 to 4, no other members are provided at a rear end of the trailing arm 12.

Figure 5:
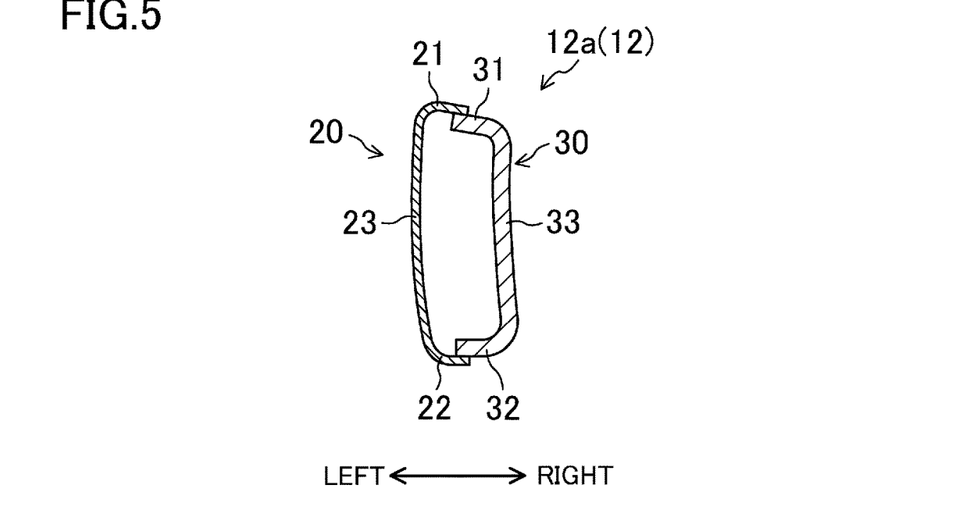
FIG. 5 is a sectional view along a V-V line of FIG. 4.
Figure 6:
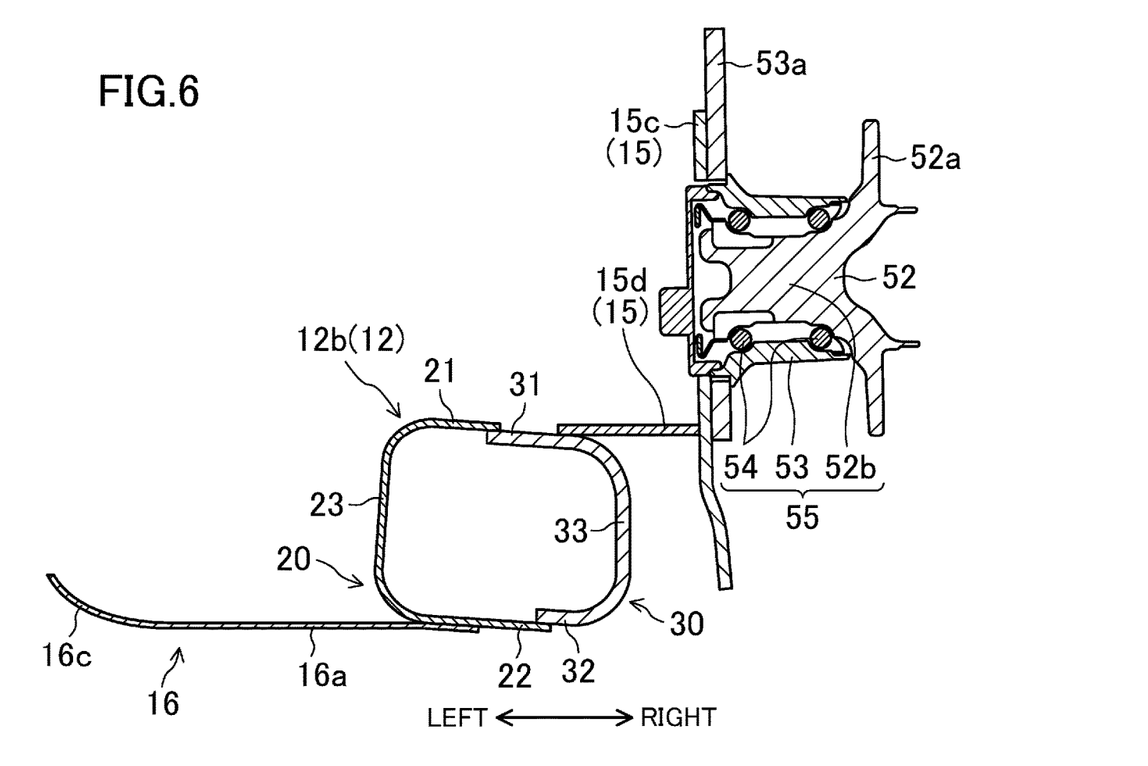
FIG. 6 is a sectional view along a VI-VI line of FIG. 4.
Figure 7:
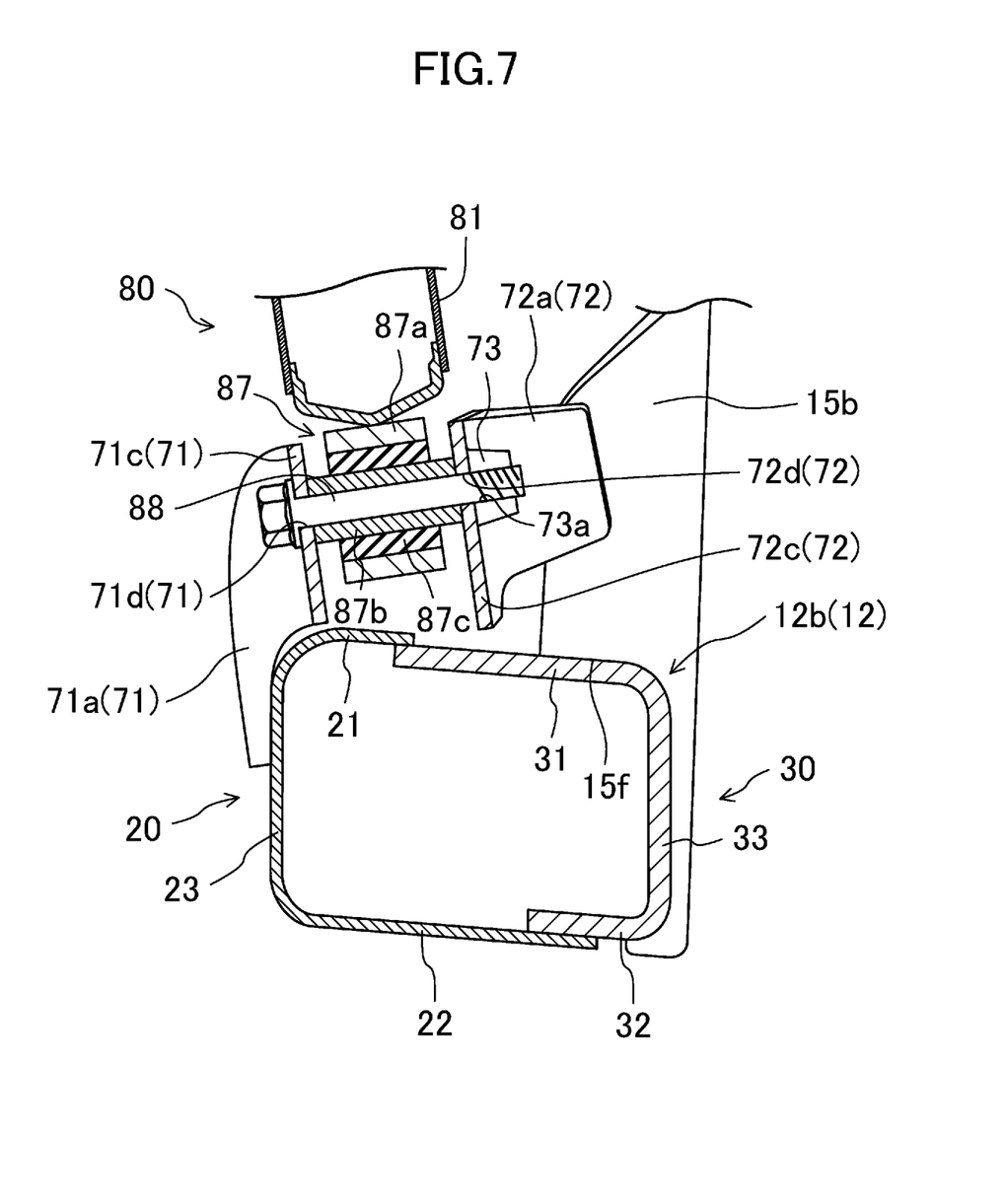
FIG. 7 is a sectional view along a VII-VII line of FIG. 4.

In the present embodiment, the trailing arm 12 is, as illustrated in FIGS. 5 to 7, divided in half in the right-to-left direction at an intermediate portion in the vehicle width direction, and the members divided in the right-to-left direction are joined to each other to form a substantially rectangular closed sectional shape across the entirety in the front-to-rear direction. Specifically, the trailing arm 12 has an inner panel 20 and an outer panel 30 (a pair of panels) each positioned on the inside and the outside in the vehicle width direction, facing each other in the vehicle width direction, and having U-shaped sections. The inner panel 20 and the outer panel 30 are joined to each other in a state in which U-shaped openings of both panels 20, 30 face each other in the vehicle width direction. Each of the inner panel 20 and the outer panel 30 is an integrally-molded component formed by press molding of a steel plate, for example. Note that the inner panel 20 and the outer panel 30 are preferably made of the same material, considering prevention of electric corrosion due to welding between the inner panel 20 and the outer panel 30.

As illustrated in FIG. 3 and FIGS. 5 to 7, the inner panel 20 has a top wall portion (hereinafter referred to as an "inner top wall portion 21") extending in the front-to-rear direction, a bottom wall portion (hereinafter referred to as an "inner bottom wall portion 22") facing the inner top wall portion 21 in the top-to-bottom direction and extending in the front-to-rear direction, and a side wall portion (hereinafter referred to as an "inner side wall portion 23") coupling a left end portion of the inner top wall portion 21 and a left end portion of the inner bottom wall portion 22. The inner side wall portion 23 is curved and inclined in the right-to-left direction to correspond to a curved and inclined shape of the trailing arm 12.

Figure 3:
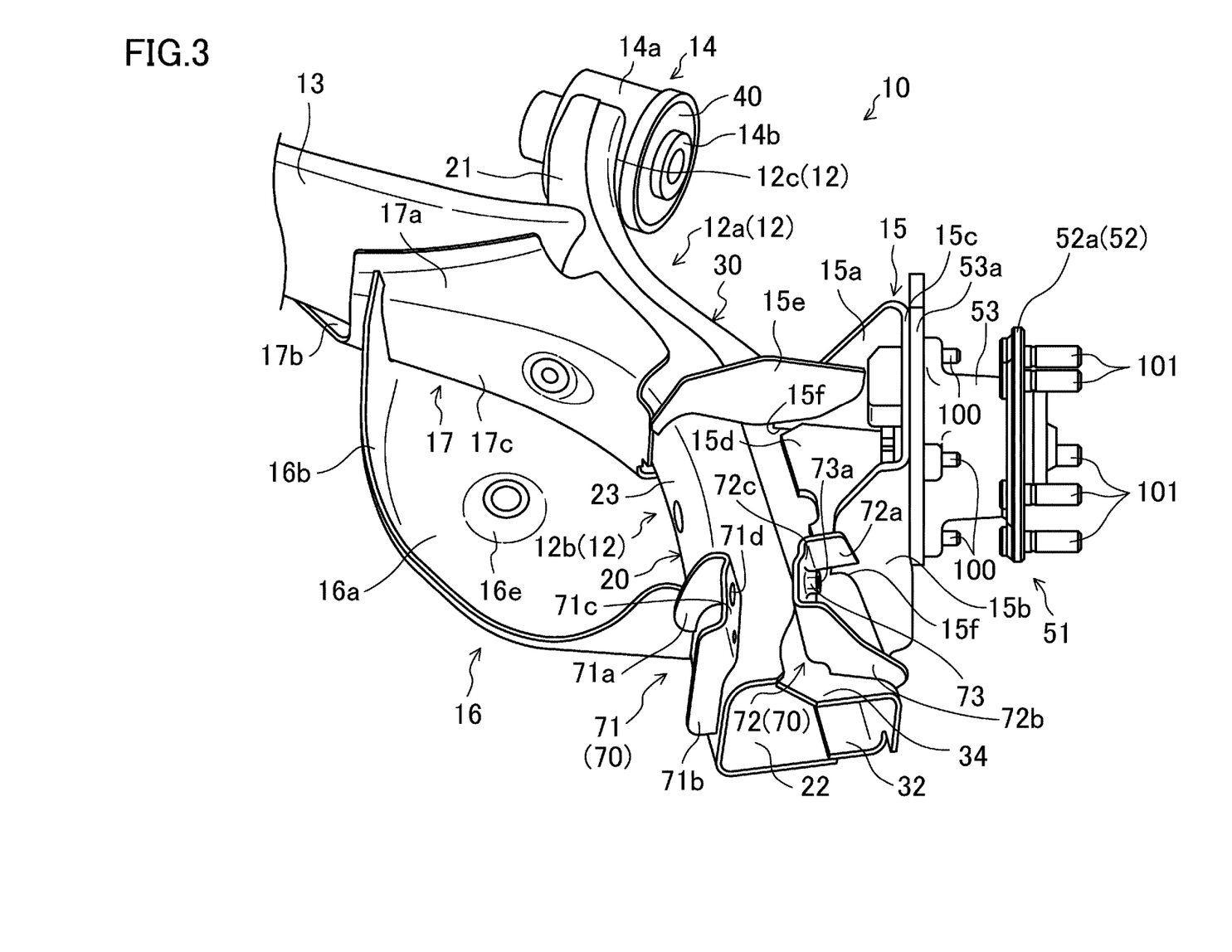
FIG. 3 is a perspective view of a right portion of the torsion beam type suspension diagonally from a top rear side.
Figure 4:
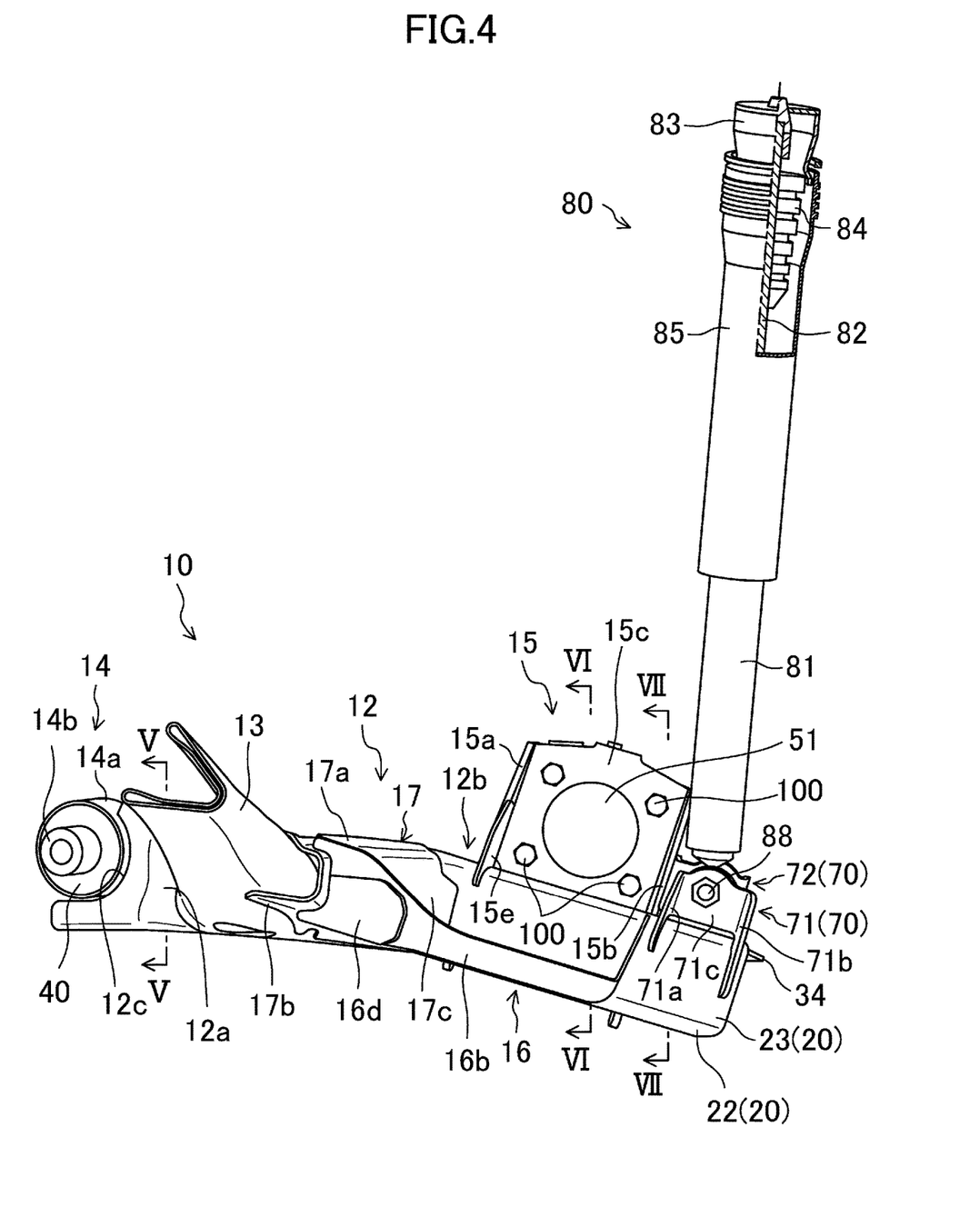
FIG. 4 is a left side view of the right portion of the torsion beam type suspension from a left side.

As illustrated in FIGS. 2 to 4, the inner top wall portion 21 and the inner bottom wall portion 22 are, as in the inner side wall portion 23, also curved and inclined in the right-to-left direction to correspond to the curved and inclined shape of the trailing arm 12. As illustrated in FIG. 2, FIG. 3, and FIGS. 5 to 7, the width of the inner top wall portion 21 in the vehicle width direction increases from the front end to the rear end of the front portion 12a at the front portion 12a of the trailing arm 12. Moreover, at the rear portion 12b of the trailing arm 12, the width of the inner top wall portion 21 in the vehicle width direction is the substantially same size as the width of the inner top wall portion 21 in the vehicle width direction at the rear end of the front portion 12a in an area extending from the front end of the rear portion 12b to an intermediate portion of the rear portion 12b in the front-to-rear direction, and a right end portion of the inner top wall portion 21 is recessed leftward at the portion in the vicinity of the rear end of the rear portion 12b such that the portion in the vicinity of the rear end of the rear portion 12b is smaller than other portions of the rear portion 12b than the inner top wall portion 21. The width of the inner bottom wall portion 22 in the vehicle width direction increases from the front end to the rear end of the front portion 12a at the front portion 12a of the trailing arm 12. Moreover, as illustrated in FIGS. 6 and 7, the width of the inner bottom wall portion 22 in the vehicle width direction has, at the rear portion 12b of the trailing arm 12, the substantially same width as the width of the inner bottom wall portion 22 in the vehicle width direction at the rear end of the front portion 12a from the front end to the rear end of the rear portion 12b.

As illustrated in FIG. 5, at the front portion 12a of the trailing arm 12, the width of the inner top wall portion 21 in the vehicle width direction (the width of a top portion of the inner panel 20) is the substantially same as the width of the inner bottom wall portion 22 in the vehicle width direction (the width of a bottom portion of the inner panel 20).

On the other hand, as illustrated in FIGS. 6 and 7, at the rear portion 12b of the trailing arm 12, the inner bottom wall portion 22 (the bottom portion of the inner panel 20) of the inner panel 20 is wider in the vehicle width direction than the inner top wall portion 21 (the top portion of the inner panel 20).

As illustrated in FIG. 3 and FIGS. 5 to 7, the outer panel 30 has a top wall portion (a top portion of the outer panel 30 hereinafter referred to as an "outer top wall portion 31") extending in the front-to-rear direction, a bottom wall portion (hereinafter referred to as an "outer bottom wall portion 32") facing the outer top wall portion 31 in the top-to-bottom direction and extending in the front-rear-direction, and a side wall portion (hereinafter referred to as an "outer side wall portion 33") coupling a right end portion of the outer top wall portion 31 and a right end portion of the outer bottom wall portion 32. The outer side wall portion 33 is curved and inclined in the right-to-left direction to correspond to the curved and inclined shape of the trailing arm 12.

As illustrated in FIGS. 2 and 3, the outer top wall portion 31 and the outer bottom wall portion 32 are, as in the outer side wall portion 33, also curved and inclined in the right-to-left direction to correspond to the curved and inclined shape of the trailing arm 12. As illustrated in FIG. 2 and FIGS. 5 to 7, the width of the outer top wall portion 31 in the vehicle width direction increases from the front end to the rear end of the front portion 12a at the front portion 12a of the trailing arm 12. Moreover, at the rear portion 12b of the trailing arm 12, the width of the outer top wall portion 31 in the vehicle width direction is the substantially same size as the width of the outer top wall portion 31 in the vehicle width direction at the rear end of the front portion 12a in an area extending from the front end of the rear portion 12b to the intermediate portion of the rear portion 12b in the front-to-rear direction, and a left end portion of the outer top wall portion 31 is raised leftward at the portion in the vicinity of the rear end of the rear portion 12b such that the portion in the vicinity of the rear end of the rear portion 12b is larger than other portions of the rear portion 12b than the outer top wall portion 31. As in the outer top wall portion 31, the width of the outer bottom wall portion 32 in the vehicle width direction increases from the front end to the rear end of the front portion 12a at the front portion 12a of the trailing arm 12. Moreover, as illustrated in FIGS. 6 and 7, the width of the outer bottom wall portion 32 in the vehicle width direction has, at the rear portion 12b of the trailing arm 12, the substantially same width as the width of the outer bottom wall portion 32 in the vehicle width direction at the rear end of the front portion 12a from the front end to the rear end of the rear portion 12b.

As illustrated in FIG. 5, at the front portion 12a of the trailing arm 12, the width of the outer top wall portion 31 in the vehicle width direction (the width of the top portion of the outer panel 30) is the substantially same as the width of the outer bottom wall portion 32 in the vehicle width direction (the width of a bottom portion of the outer panel 30).

On the other hand, as illustrated in FIGS. 6 and 7, at the rear portion 12b of the trailing arm 12, the outer top wall portion 31 (the top portion of the outer panel 30) of the outer panel 30 is wider in the vehicle width direction than the outer bottom wall portion 32 (the bottom portion of the outer panel 30).

As illustrated in FIGS. 5 to 7, the thickness of the outer panel 30 is greater than the thickness of the inner panel 20 across the entirety of the trailing arm 12.

In comparison between the average of the width of the inner top wall portion 21 in the vehicle width direction and the width of the inner bottom wall portion 22 in the vehicle width direction and the average of the width of the outer top wall portion 31 in the vehicle width direction and the width of the outer bottom wall portion 32 in the vehicle width direction, there is a difference in a width change between each top wall portion 21, 31 and each bottom wall portion 22, 32, but the width of the inner panel 20 in the vehicle width direction and the width of the outer panel 30 in the vehicle width direction have the same level of size across the entirety of the trailing arm 12.

The inner panel 20 and the outer panel 30 are joined to each other in such a manner that the inner top wall portion 21 and the outer top wall portion 31 are welded to each other and the inner bottom wall portion 22 and the outer bottom wall portion 32 are welded to each other such that the sectional shape of the trailing arm 12 is in a closed sectional shape. Specifically, as illustrated in FIGS. 5 to 7, in a state in which the right end portion of the inner top wall portion 21 overlaps with the top side of the left end portion of the outer top wall portion 31, the right end portion of the inner top wall portion 21 and the left end portion of the outer top wall portion 31 are joined to each other by welding. On the other hand, in a state in which the right end portion of the inner bottom wall portion 22 overlaps with the bottom side of the left end portion of the outer bottom wall portion 32, the right end portion of the inner bottom wall portion 22 and the left end portion of the outer bottom wall portion 32 are joined to each other by welding. With this configuration, the inner and outer top wall portions 21, 31, the inner and outer bottom wall portions 22, 32, and the inner and outer side wall portions 23, 33 form the closed sectional shape of the trailing arm 12. Moreover, the inner panel 20 and the outer panel 30 are joined to each other as described above to form a step at a joint portion between the inner panel 20 and the outer panel 30. Note that the inner panel 20 and the outer panel 30 may be joined to each other in such a manner that the right end portion of the inner top wall portion 21 and the left end portion of the outer top wall portion 31 are butt-joined to each other and the right end portion of the inner bottom wall portion 22 and the left end portion of the outer bottom wall portion 32 are butt-joined to each other.

Moreover, as illustrated in FIG. 3, an extension portion 34 extending backward with respect to a rear end of the inner panel 20 is formed at rear end portions of the outer top wall portion 31 and the outer side wall portion 33 of the outer panel 30. Although details will be described later, an outer damper bracket 72 of the damper bracket 70 is joined to the extension portion 34.

Next, the members attached to the trailing arm 12 will be described.

The above-described torsion beam 13 is molded in such a manner that an intermediate front portion of a hollow oval pipe in a longitudinal direction thereof is pressed from the front side to the rear side such that a cross-sectional shape forms a closed section and a deformed sectional shape. In the present embodiment, the torsion beam 13 is, at both end portions thereof in the longitudinal direction, in an oval sectional shape as the original shape of the pipe, and the deformed sectional shape of the intermediate portion of the torsion beam 13 in the longitudinal direction thereof is in an U-shape whose opening is positioned on the front side as illustrated in FIG. 4. Moreover, the above-described deformed sectional shape is such a shape that the shape of the U-shape becomes larger from both end portions in the longitudinal direction to the center in the longitudinal direction.

Both end portions of the torsion beam 13 in the longitudinal direction thereof are each welded to the front portions 12a of the right and left trailing arms 12. Specifically, the right end portion of the torsion beam 13 in the longitudinal direction thereof is welded to the inner panel 20 of the right trailing arm 12 at the front portion 12a of the right trailing arm 12 (see FIGS. 1 to 3), and the left end portion of the torsion beam 13 in the longitudinal direction thereof is welded to the inner panel 20 of the left trailing arm 12 at the front portion 12a of the left trailing arm 12 (see FIG. 1).

The above-described suspension bush 14 is fixed to the front end portion of the trailing arm 12 as described above.

As illustrated in FIGS. 3 and 4, the suspension bush 14 has an outer cylinder 14a fixed to the front end portion of the trailing arm 12, an inner cylinder 14b arranged coaxially with the outer cylinder 14a on the inside of the outer cylinder 14a, and an elastic member 40 arranged between the outer cylinder 14a and the inner cylinder 14b.

As illustrated in FIGS. 3 and 4, a front end portion of the inner side wall portion 23 and a front end portion of the outer side wall portion 33 form, corresponding to the shape of the outer cylinder 14a, a cutout portion 12c (see FIG. 4 for a cutout portion 12c of the inner side wall portion 23, and see FIG. 3 for a cutout portion 12c of the outer side wall portion 33) opening to the front side and cut out in a U-shape. The outer cylinder 14a is fitted in the cutout portion 12c, and the outer cylinder 14a and each of the inner and outer side wall portions 23, 33 are welded to each other. In this manner, the suspension bush 14 is fixed to the front end portion of the trailing arm 12. As illustrated in FIG. 2, the suspension bush 14 is arranged such that a cylinder axis thereof (the axes of the outer cylinder 14a and the inner cylinder 14b) is slightly inclined to the front-to-rear direction with respect to the vehicle width direction. Specifically, the suspension bush 14 is arranged such that the cylinder axis thereof is slightly inclined backward from the left side to the right side.

As illustrated in FIG. 2, a shaft member 41 is inserted into the inner cylinder 14b of the suspension bush 14. A right end portion of the shaft member 41 is attached to a side sill extension portion 6 extending from a side sill 2 and a wheel house panel 7, and a left end portion of the shaft member 41 is attached to a bracket 3 provided at the side sill 2 and a reinforcement member 5 joined to the bracket 3. Specifically, a weld nut 42 is fixed to a left (i.e., the inside in the vehicle width direction) surface of the bracket 3, and a tip end (the left end portion in FIG. 2) of the shaft member 41 and the weld nut 42 are fastened to couple the shaft member 41 to the vehicle body of the above-described vehicle. Accordingly, the trailing arm 12 is coupled to the vehicle body of the above-described vehicle through the shaft member 41, and is swingable in the top-to-bottom direction about the front end portion of the trailing arm 12 as a pivot point.

The above-described spring seat 16 is coupled to the trailing arm 12 and the torsion beam 13 through the corner portion reinforcement member 17.

The corner portion reinforcement member 17 has an top surface portion 17a (see FIGS. 1 to 3) expanding in the vehicle width direction and the front-to-rear direction along the trailing arm 12 and the torsion beam 13 and forming a substantially triangular shape as viewed in plane, a bottom surface portion 17b (see FIG. 4) expanding to face the top surface portion 17a, and a coupling portion 17c coupling an end portion of the top surface portion 17a from the front left side to the rear right side and an end portion of the bottom surface portion 17b from the front left side to the rear right side.

As illustrated in FIG. 2, a front end portion of the top surface portion 17a of the corner portion reinforcement member 17 extends in the vehicle width direction along a rear portion of the torsion beam 13. On the other hand, a right end portion of the top surface portion 17a extends in the front-to-rear direction along the inner top wall portion 21 of the inner panel 20, and is welded to the inner top wall portion 21.

As illustrated in FIG. 4, a front end portion of the bottom surface portion 17b of the corner portion reinforcement member 17 is positioned below the torsion beam 13, and is welded to a bottom portion of the torsion beam 13. On the other hand, a right end portion of the bottom surface portion 17b is positioned below the inner panel 20, and is welded to the inner bottom wall portion 22.

As illustrated in FIGS. 3 and 4, the coupling portion 17c of the corner portion reinforcement member 17 is configured such that a rear right end portion thereof extends backward with respect to a rear right end portion of the top surface portion 17a and a rear right end portion of the bottom surface portion 17b and such an extension portion is welded to the inner side wall portion 23.

As illustrated in FIGS. 2 and 3, the spring seat 16 has a bottom wall portion 16a forming a substantially fan shape as viewed in plane, a flange portion 16b formed along an outer peripheral end portion of the substantially fan shape of the bottom wall portion 16a, and a spring attachment portion 16c provided at the substantially center of the bottom wall portion 16a and attached to the coil spring (not shown).

The spring seat 16 is, for example, an integrally-molded component formed by press molding of a steel plate. The flange portion 16b stands upwardly from an outer peripheral end portion of the bottom wall portion 16a.

The fan shape of the bottom wall portion 16a is a fan shape about a corner portion between the coupling portion 17c of the corner portion reinforcement member 17 and the inner side wall portion 23. As illustrated in FIG. 3, a front end portion of the bottom wall portion 16a extends inclined backward to the right side along a corner portion between the coupling portion 17c and the bottom surface portion 17b of the corner portion reinforcement member 17, and is welded to the bottom surface portion 17b. On the other hand, as illustrated in FIGS. 3 and 6, a right end portion of the bottom wall portion 16a extends in the front-to-rear direction along the inner bottom wall portion 22, and is welded to the inner bottom wall portion 22.

As illustrated in FIGS. 3 and 4, a front left portion of the flange portion 16b expands in a triangular shape as viewed from the side of the vehicle such that a length in the top-to-bottom direction increases toward the front side. A front left end portion of the flange portion 16b contacts a front left end portion of the coupling portion 17c of the corner portion reinforcement member 17, and is welded to the front left end portion of the coupling portion 17c. On the other hand, as illustrated in FIG. 3, a rear right portion of the flange portion 16b expands in a triangular shape as viewed from the rear side such that a length in the top-to-bottom direction increases toward the right side. A rear right end portion of the flange portion 16b contacts the inner side wall portion 23, and is welded to the inner side wall portion 23.

Moreover, as illustrated in FIG. 4, the spring seat 16 and the corner portion reinforcement member 17 are also coupled to each other through a reinforcement member 16d. The reinforcement member 16d extends in the front-to-rear direction. A top end portion of the reinforcement member 16d is welded to a front left surface of the flange portion 16b, and a front left end portion of the reinforcement member 16d is welded to the coupling portion 17c of the corner portion reinforcement member 17.

With this configuration, the spring seat 16 is coupled to the trailing arm 12 and the torsion beam 13 through the corner portion reinforcement member 17 at the corner portion between the right end portion of the torsion beam 13 in the longitudinal direction thereof and the right trailing arm 12.

The above-described axle unit 51 is, at the rear portion 12b of the trailing arm 12, supported on the trailing arm 12 through the axle bracket 15 attached to the inner panel 20.

The axle bracket 15 is, for example, configured such that a metal plate is bent in a substantially U-shape as viewed in plane. As illustrated in FIGS. 3 and 4, the axle bracket 15 has a front surface portion 15a extending in the top-to-bottom direction from a height position lower than the outer bottom wall portion 32 to a height position higher than the outer top wall portion 31, a rear surface portion 15b facing the front surface portion 15a on the rear side thereof and extending in the substantially same top-to-bottom area as that of the front surface portion 15a, and an outer surface portion 15c coupling a right end portion of the axle bracket 15 and a right end portion of the rear surface portion 15b. As illustrated in FIGS. 2 and 3, at each of the front surface portion 15a and the rear surface portion 15b of the axle bracket 15 in an area at the same height as that of the outer panel 30, a cutout portion 15f cut out in a U-shape is formed along the outer top wall portion 31, the outer side wall portion 33, and the outer bottom wall portion 32 of the outer panel 30. The axle bracket 15 is fixed to the outer panel 30 in such a manner that after each cutout portion 15f has been arranged along the outer top wall portion 31, the outer side wall portion 33, and the outer bottom wall portion 32, the front surface portion 15a and the rear surface portion 15b are welded to an outer portion of the outer top wall portion 31 in the vehicle width direction, the outer side wall portion 33, and an outer portion of the outer bottom wall portion 32 in the vehicle width direction. Note that each of the cutout portions 15f at the front surface portion 15a and the rear surface portion 15b of the axle bracket 15 may be an L-shaped cutout along the outer top wall portion 31 and the outer side wall portion 33 of the outer panel 30. In a case where the cutout portion 15f is in an L-shape, each of the front surface portion 15a and the rear surface portion 15b is welded to the outer portion of the outer top wall portion 31 in the vehicle width direction and the outer side wall portion 33.

Moreover, as illustrated in FIGS. 2 and 3, a first auxiliary member 15d for preventing deformation of the axle bracket 15 due to a load in the front-to-rear direction is provided at a portion surrounded by the front surface portion 15a, the rear surface portion 15b, and the outer surface portion 15c of the axle bracket 15 and the outer panel 30. The first auxiliary member 15d is, at each peripheral edge portion thereof, welded to the front surface portion 15a, the rear surface portion 15b, and the outer surface portion 15c of the axle bracket 15 and the outer portion of the outer top wall portion 31 of the outer panel 30 in the vehicle width direction. Note that if the strength and stiffness of the axle bracket 15 can be ensured without the first auxiliary member 15d, the first auxiliary member 15d may be omitted.

Further, a second auxiliary member 15e for improving the stiffness of attachment of the axle bracket 15 to the trailing arm 12 is joined to the front surface portion 15a of the axle bracket 15. The second auxiliary member 15e extends in the vehicle width direction over the inner top wall portion 21 and the outer top wall portion 31. A bottom end portion of a left portion of the second auxiliary member 15e is welded to the inner top wall portion 21, and on the other hand, a top end portion of a right portion of the second auxiliary member 15e is welded to a rear surface of the front surface portion 15a of the axle bracket 15. Note that the second auxiliary member 15e is not necessarily provided.

As illustrated in FIGS. 2, 3, and 6, the axle unit 51 has a hub 52 attached to a wheel 50a (see FIG. 2) of the rear wheel 50, and a housing 53 housing a shaft portion 52b of the hub 52. As illustrated in FIG. 6, a ball bearing 55 is formed by the shaft portion 52b of the hub 52, the housing 53, and balls 54, and therefore, the hub 52 (and therefore the rear wheel 50) is rotatably held on the housing 53. A flange portion 53a is provided at a left portion of the housing 53, and by a fastening member 100 (see FIGS. 1 to 4), is attached and fixed to a portion of the outer surface portion 15c of the axle bracket 15 positioned higher than the outer panel 30. Accordingly, the axle unit 51 is attached to the axle bracket 15 coupled and fixed to the rear portion 12b of the trailing arm 12. In a state in which the axle unit 51 is attached to the axle bracket 15, the axle unit 51 protrudes rightward, and the center of the hub 52 of the axle unit 51 extends in the vehicle width direction at a height position higher than the trailing arm 12.

As illustrated in FIGS. 2, 3, and 6, a hub flange 52a expanding outward in a radial direction of the hub 52 is formed at a right portion of the hub 52, and the wheel 50a of the rear wheel 50 is fastened to the hub flange 52a of the hub 52 by a fastening member 101 (specifically see FIG. 2). With this configuration, the rear wheel 50 is supported on a rear portion of the outer panel 30 through the axle unit 51 and the axle bracket 15.

The axle unit 51 is arranged higher than the outer panel 30 on the outside in the vehicle width direction at the outer surface portion 15c of the axle bracket 15, and therefore, a load from the axle unit 51 is mainly on an outer top portion (a portion from the outer portion of the outer top wall portion 31 in the vehicle width direction to a top portion of the outer side wall portion 33) of a peripheral wall portion in the vehicle width direction in the section (the closed section) of the rear portion 12b of the trailing arm 12 through the axle bracket 15 (specifically top portions of the front surface portion 15a and the rear surface portion 15b and the first auxiliary member 15d). It can be said that the axle unit 51 is basically coupled to the outer top portion of the peripheral wall portion in the vehicle width direction in the section of the rear portion 12b of the trailing arm 12 through the axle bracket 15 including the first auxiliary member 15d.

In the present embodiment, a portion (a portion in a circumferential direction) of the peripheral wall portion including the outer top portion in the vehicle width direction in the section of the rear portion 12b of the trailing arm 12 is formed by the thicker outer panel 30. Thus, the support stiffness of the trailing arm 12 for the rear wheel 50 is enhanced. Moreover, a remaining portion (a portion to which no load from the axle unit 51 is basically applied) of the above-described peripheral wall portion is formed by the thinner inner panel 20. Thus, an increase in the weight of the trailing arm 12 can be suppressed.

The above-described damper 80 is attached to and supported on the damper bracket 70 provided at a portion of the trailing arm 12 on the rear side with respect to a rear end of the spring seat 16.

As illustrated in FIG. 4, the damper 80 has a cylinder 81 extending in the top-to-bottom direction, a piston rod 82 extending coaxially with the cylinder 81 in the top-to-bottom direction, a vehicle body attachment portion 83 provided at a top end portion of the piston rod 82 for attaching the damper 80 to the vehicle body of the above-described vehicle, a bump stopper 84 held on the vehicle body attachment portion 83, and a tubular cover 85 covering a top portion of the cylinder 81, the piston rod 82, and the bump stopper 84. Moreover, a bracket attachment portion 87 (see FIG. 7) attached to the damper bracket 70 is provided at a bottom end portion of the cylinder 81.

The bump stopper 84 is made of an elastic material such as rubber or urethane, and is arranged at the outer periphery on a top end side of the piston rod 82. The bump stopper 84 contacts, upon bumping of the above-described vehicle, a top end of the cylinder 81 to attenuate impact and reduce excessive contraction (displacement) of the damper 80.

As illustrated in FIG. 7, the bracket attachment portion 87 has an outer cylinder 87a, an inner cylinder 87b arranged coaxially with the outer cylinder 87a on the inside of the outer cylinder 87a, and a bush 87c arranged between the outer cylinder 87a and the inner cylinder 87b. A shaft member 88 for attaching the damper 80 to the damper bracket 70 is inserted into the inner cylinder 87b.

As illustrated in FIG. 3, the damper bracket 70 has an inner damper bracket 71 relatively positioned on the inside, and the outer damper bracket 72 arranged facing the inner damper bracket 71 in the vehicle width direction and relatively positioned on the outside.

The inner damper bracket 71 is in a U-shape opening on the left side as viewed in plane, and is coupled to the inner side wall portion 23. Specifically, the inner damper bracket 71 has a front surface portion 71a extending in the top-to-bottom direction, and a rear surface portion 71b provided to separate backward from the front surface portion 71a and extending in the top-to-bottom direction to face the front surface portion 71a. As illustrated in FIGS. 3 and 4, the front surface portion 71a and the rear surface portion 71b extend top to bottom along the inner side wall portion 23, and top portions of the front surface portion 71a and the rear surface portion 71b are positioned higher than the inner top wall portion 21. Right end portions of the top portions of the front surface portion 71a and the rear surface portion 71b are coupled to each other by a right surface portion 71c extending in the front-to-rear direction.

Each of right end portions of bottom portions of the front surface portion 71a and the rear surface portion 71b of the inner damper bracket 71 is welded to the inner side wall portion 23.

As illustrated in FIGS. 3, 4, and 7, a hole 71d into which the shaft member 88 for attaching the damper 80 to the damper bracket 70 is inserted is provided at the right surface portion 71c of the inner damper bracket 71.

The outer damper bracket 72 is in a U-shape opening on the right side as viewed in plane, and is coupled to the outer top wall portion 31. Specifically, the outer damper bracket 72 has a front surface portion 72a extending in the vehicle width direction, and a rear surface portion 72b provided to separate backward from the front surface portion 72a and extending in the vehicle width direction to face the front surface portion 71a. As illustrated in FIG. 3, left end portions of the front surface portion 71a and the rear surface portion 71b are coupled to each other by a left surface portion 72c extending in the front-to-rear direction.

As illustrated in FIG. 3, the front surface portion 72a of the outer damper bracket 72 is positioned higher than the outer top wall portion 31 without contacting the outer top wall portion 31. The front surface portion 72a overlaps with the rear surface portion 15b of the axle bracket 15 from the rear side, and a right end portion of the front surface portion 72a is welded to a rear surface of the rear surface portion 15b of the axle bracket 15. With this configuration, the outer damper bracket 72 is coupled to the outer damper bracket 72 as a member forming the rear wheel support unit.

As illustrated in FIG. 2, the rear surface portion 72b of the outer damper bracket 72 is positioned at the extension portion 34 of the outer panel 30. A bottom end portion of the rear surface portion 72b is welded to the extension portion 34. With this configuration, the outer damper bracket 72 is coupled to the extension portion 34.

As illustrated in FIG. 7, a hole 72d into which the shaft member 88 is inserted is, as in the right surface portion 71c of the inner damper bracket 71, provided at the left surface portion 72c of the outer damper bracket 72.

Moreover, as illustrated in FIGS. 3 and 7, a weld nut 73 is fixed to a right portion of the left surface portion 72c of the outer damper bracket 72. The weld nut 73 is configured such that a screw hole 73a (specifically see FIG. 7) thereof is fixed to a position coaxially with the hole 72d provided at the left surface portion 72c of the outer damper bracket 72.

As illustrated in FIG. 7, the inner and outer damper brackets 71, 72 are coupled to the trailing arm 12 such that a right surface of the right surface portion 71c of the inner damper bracket 71 and a left surface of the left surface portion 72c of the outer damper bracket 72 face the vehicle width direction. In a state in which the inner and outer damper brackets 71, 72 are coupled to the trailing arm 12, the hole 71d of the right surface portion 71c of the inner damper bracket 71 and the screw hole 73a of the weld nut 73 are arranged in line in the vehicle width direction as illustrated in FIG. 7.

When the damper 80 is attached to the damper bracket 70, the bracket attachment portion 87 of the damper 80 is arranged between the inner damper bracket 71 and the outer damper bracket 72 such that a hole of the inner cylinder 87b of the bracket attachment portion 87 is arranged in line with the hole 71d of a side wall portion of the inner damper bracket 71 and the screw hole 73a of the weld nut 73. Thereafter, the shaft member 88 is inserted into the hole 71d of the right surface portion 71c of the inner damper bracket 71, the hole of the inner cylinder 87b, and the screw hole 73a of the weld nut 73, and a tip end portion (in FIG. 7, a right end portion) of the shaft member 88 is fastened to the weld nut 73. Accordingly, the damper 80 is attached to and supported on the damper bracket 70.

Moreover, the damper bracket 70 is configured as described above, and therefore, the damper 80 is, as illustrated in FIGS. 3 and 7, supported on the damper bracket 70 at a position above a rear end portion of the trailing arm 12 in the vehicle width direction.

In the present embodiment, the right trailing arm 12 and the components attached to the right trailing arm 12 are configured as described above. The left trailing arm 12 and the components attached to the left trailing arm 12 are configured symmetrically to the above-described configurations of the right trailing arm 12 etc. in the right-to-left direction.

Thus, in the present embodiment, the axle unit 51 is basically coupled to the thicker outer panel 30 through the axle bracket 15 including the first auxiliary member 15d, and therefore, the support stiffness of the trailing arm 12 for the rear wheel 50 can be enhanced. Moreover, the remaining portion (the portion to which no load from the axle unit 51 is basically applied) of the above-described peripheral wall portion is formed by the thinner inner panel 20, and therefore, an increase in the weight of the trailing arm 12 and therefore an increase in the weight of the rear portion of the vehicle can be suppressed.

Moreover, in the present embodiment, the portion (the portion from the outer portion of the outer top wall portion 31 in the vehicle width direction to the top portion of the outer side wall portion 33) of the peripheral wall portion including the outer top portion in the vehicle width direction in the section of the rear portion 12b of the trailing arm 12 is formed by the outer panel 30, and the axle unit 51 is basically coupled to the outer top portion of the peripheral wall portion in the vehicle width direction in the section of the rear portion 12b of the trailing arm 12 through the axle bracket 15 including the first auxiliary member 15d. Thus, the support stiffness of the trailing arm 12 for the rear wheel 50 can be enhanced.

Specifically in the present embodiment, at the rear portion 12b of the trailing arm 12 having the substantially rectangular closed sectional shape, the outer top wall portion 31 of the outer panel 30 is wider in the vehicle width direction than the outer bottom wall portion 32, and the inner bottom wall portion 22 of the inner panel 20 is wider in the vehicle width direction than the inner top wall portion 21. Thus, while an increase in the weight of the trailing arm 12 can be suppressed, the support stiffness of the trailing arm 12 for the rear wheel 50 can be enhanced in such a manner that a stiffness center in the section of the rear portion 12b of the trailing arm 12 is positioned closer to the outer top portion of the peripheral wall portion in the vehicle width direction (i.e., the axle unit 51).

The technique according to the present disclosure is not limited to the above-described embodiment, and substitution can be made without departing from the gist of the claims.

For example, in the above-described embodiment, each trailing arm 12 includes the inner panel 20 and the outer panel 30 having the U-shaped sections and joined to each other in a state in which the U-shaped openings face each other in the vehicle width direction. However, the U-shaped openings of the pair of panels having different thicknesses may face each other in any direction such as the top-to-bottom direction or the direction of extending outward in the vehicle width direction toward the top side, and the portion of the peripheral wall portion including at least the outer top portion in the vehicle width direction in the section of the rear portion 12b of each trailing arm 12 may be formed by the thicker panel.

Figure 8:
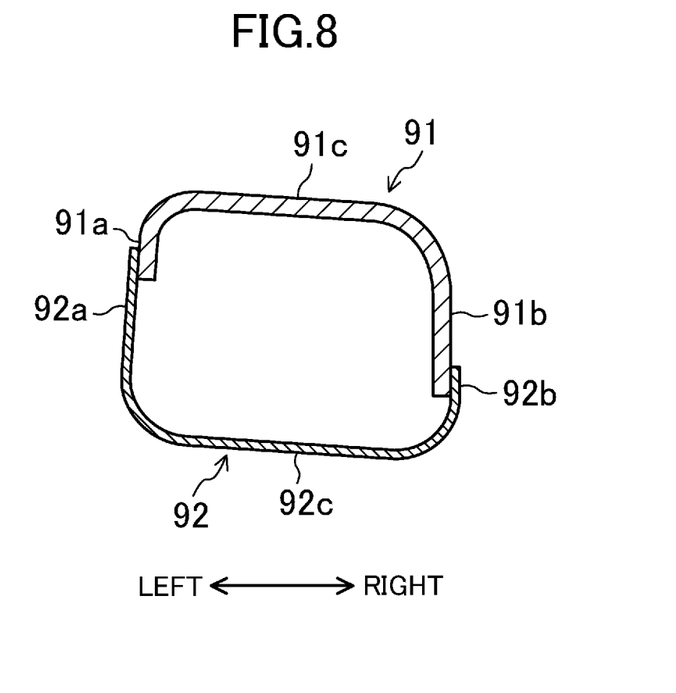
FIG. 8 is a sectional view of a rear portion of a right trailing arm according to a variation.

FIG. 8 is a sectional view (a sectional view at the same position in the front-to-rear direction as that of FIG. 6) of the rear portion 12b of the right trailing arm 12 according to a variation. In this variation, each trailing arm 12 includes a top panel 91 and a bottom panel 92 having U-shaped sections and joined to each other in a state in which U-shaped openings face each other in the top-to-bottom direction. The top panel 91 and the bottom panel 92 are equivalent to a pair of panels joined to each other in a state in which U-shaped openings face each other such that the sectional shape of the trailing arm 12 is a closed sectional shape. In this case, the thickness of the top panel 91 of each trailing arm 12 is greater than the thickness of the bottom panel 92. The top panel 91 of each trailing arm 12 has an inner wall portion 91a and an outer wall portion 91b facing the vehicle width direction, and a top wall portion 91c coupling a top end portion of the inner wall portion 91a and a top end portion of the outer wall portion 91b. The bottom panel 92 has an inner wall portion 92a and an outer wall portion 92b facing the vehicle width direction, and a bottom wall portion 92c coupling a bottom end portion of the inner wall portion 92a and a bottom end portion of the outer wall portion 92b. The inner wall portion 91a of the top panel 91 and the inner wall portion 92a of the bottom panel 92 are joined to each other by welding, and the outer wall portion 91b of the top panel 91 and the outer wall portion 92b of the bottom panel 92 are joined to each other by welding. The stiffness center in the section of the rear portion 12b of each trailing arm 12 is positioned closer to an outer top portion of a peripheral wall portion in the vehicle width direction in such a section. Thus, the length of the outer wall portion 91b of the top panel 91 in the top-to-bottom direction is longer than the length of the inner wall portion 91a of the top panel 91 in the top-to-bottom direction, and the length of the inner wall portion 92a of the bottom panel 92 in the top-to-bottom direction is longer than the length of the outer wall portion 92b of the bottom panel 92 in the top-to-bottom direction. Moreover, as in the above-described embodiment, the axle unit 51 is basically coupled to the outer top portion (a portion from an outer portion of the top wall portion 91c of the top panel 91 in the vehicle width direction to an outer portion of the outer wall portion 91b) of the peripheral wall portion in the vehicle width direction in the section of the rear portion 12b of the trailing arm 12 through the axle bracket 15. Note that in the above-described variation, the front portion 12a of the trailing arm 12 also includes, as in the rear portion 12b, a top panel 91 and a bottom panel 92 facing each other in the top-to-bottom direction.

Moreover, in the above-described embodiment, it is configured such that the outer panel 30 of the pair of panels forming each trailing arm 12 has a greater thickness than that of the inner panel 20 and the rear wheel support unit is coupled to the outer panel 30. However, it may be conversely configured such that the inner panel 20 has a greater thickness than that of the outer panel 30 and the rear wheel support unit is coupled to the inner panel 20. In this case, the configuration of the above-described axle unit needs to be designed such that the axle unit 51 protrudes outward in the vehicle width direction when the axle unit 51 is attached to the axle bracket as the rear wheel support unit.

A portion of the axle unit 51 (the axle bracket 15) coupled to the rear portion 12b of the trailing arm 12 may be only the outer top portion of the peripheral wall portion in the vehicle width direction in the section of the rear portion 12b, and as long as the coupling portion includes such a portion of the peripheral wall portion, may be any portion (may be part or the entire circumference of the peripheral wall portion).

Moreover, the closed sectional shape of the front portion 12a and the rear portion 12b of each trailing arm 12 is not limited to the rectangular shape, and may be any shape. Further, the front portion 12a and the rear portion 12b may be different from each other in the closed sectional shape. In addition, the front portion 12a and the rear portion 12b may be different from each other in the direction in which the panels in a pair face each other.

The above-described embodiment has been set forth merely as an example, and the scope of the technique according to the present disclosure should not be interpreted in a limited manner. The scope of the technique according to the present disclosure is defined by the claims, and all variations and changes belonging to the scope of equivalency of the claims are intended to be embraced in the scope of the technique according to the present disclosure.

INDUSTRIAL APPLICABILITY

The technique disclosed herein is useful for an automobile rear suspension structure including a torsion beam type suspension having a pair of right and left trailing arms extending in a vehicle longitudinal direction and each supporting right and left rear wheels and a torsion beam extending in a vehicle width direction and coupling both trailing arms.

DESCRIPTION OF REFERENCE CHARACTERS

10 Torsion Beam Type Suspension
12 Trailing Arm
12a Front Portion of Trailing Arm
12b Rear Portion of Trailing Arm
13 Torsion Beam
15 Axle Bracket (Rear Wheel Support Unit)
20 Inner Panel (Panel Pair)
21 Top Wall Portion (Top Portion of Inner Panel) Of Inner Panel
22 Bottom Wall Portion (Bottom Portion of Inner Panel) Of Inner Panel
30 Outer Panel (Panel Pair)
31 Top Wall Portion (Top Portion of Outer Panel) Of Outer Panel
32 Bottom Wall Portion (Bottom Portion of Outer Panel) Of Outer Panel
50 Rear Wheel 51 Axle Unit (Rear Wheel Support Unit, Attachment Unit)
91 Top Panel (Panel Pair)
92 Bottom Panel (Panel Pair)

The invention claimed is:

1. An automobile rear suspension structure comprising:
a suspension including a pair of right and left trailing arms extending in a vehicle longitudinal direction and each supporting right and left rear wheels and a torsion beam extending in a vehicle width direction and coupling both trailing arms,
wherein each trailing arm includes a pair of panels having U-shaped sections and joined to each other in a state in which U-shaped openings face each other such that a sectional shape of the each trailing arm forms a closed sectional shape,
a thickness of one of the panels is greater than a thickness of the other one of the panels,
a rear wheel support unit configured to support each rear wheel is coupled to the one of the panels,
the rear wheel support unit has a hub protruding outward in the vehicle width direction from a coupling portion where the rear wheel support unit and a corresponding one of the trailing arms are coupled together, and having a shaft portion located above the trailing arm, and
each of the pair of panels has a shape such that a stiffness center in a section of a rear portion of each of the trailing arms is positioned closer to an outer top portion of a peripheral wall portion in the vehicle width direction.

2. The automobile rear suspension structure according to claim 1, wherein
the one of the panels forms a portion of a peripheral wall portion including at least an outer top portion in the vehicle width direction in at least a section of a rear portion of the each trailing arm, and
the rear wheel support unit configured to support the each rear wheel is coupled to at least the outer top portion of the peripheral wall portion in the vehicle width direction in the section of the rear portion of the each trailing arm.

3. The automobile rear suspension structure according to claim 2, wherein
the rear portion of the each trailing arm is wider in the vehicle width direction than a front portion of the each trailing arm.

4. The automobile rear suspension structure according to claim 2, wherein
the pair of panels include a top panel and a bottom panel facing each other in a top-to-bottom direction,
a thickness of the top panel is greater than a thickness of the bottom panel,
at the rear portion of the each trailing arm, an outer portion of the top panel in the vehicle width direction is wider in the top-to-bottom direction than an inner portion of the top panel in the vehicle width direction, and
the rear wheel support unit coupled to the each trailing arm is coupled to the top panel of the each trailing arm.

5. The automobile rear suspension structure according to claim 4, wherein
a closed sectional shape of the rear portion of the each trailing arm is a substantially rectangular shape,
the rear wheel support unit includes an attachment unit attached to the each rear wheel, and a bracket for supporting the attachment unit on the top panel, and the bracket is attached over a top portion of the top panel and the outer portion of the top panel in the vehicle width direction.

6. The automobile rear suspension structure according to claim 1, wherein
the rear portion of the each trailing arm is wider in the vehicle width direction than a front portion of the each trailing arm.

7. The automobile rear suspension structure according to claim 1, wherein
the pair of panels include a top panel and a bottom panel facing each other in a top-to-bottom direction,
a thickness of the top panel is greater than a thickness of the bottom panel,
at the rear portion of the each trailing arm, an outer portion of the top panel in the vehicle width direction is wider in the top-to-bottom direction than an inner portion of the top panel in the vehicle width direction, and
the rear wheel support unit coupled to the each trailing arm is coupled to the top panel of the each trailing arm.

8. The automobile rear suspension structure according to claim 7, wherein
a closed sectional shape of the rear portion of the each trailing arm is a substantially rectangular shape,
the rear wheel support unit includes an attachment unit attached to the each rear wheel, and a bracket for supporting the attachment unit on the top panel, and
the bracket is attached over a top portion of the top panel and the outer portion of the top panel in the vehicle width direction.

9. An automobile rear suspension structure comprising:
a suspension including a pair of right and left trailing arms extending in a vehicle longitudinal direction and each supporting right and left rear wheels and a torsion beam extending in a vehicle width direction and coupling both trailing arms,
wherein each trailing arm includes a pair of panels having U-shaped sections and joined to each other in a state in which U-shaped openings face each other such that a sectional shape of the each trailing arm forms a closed sectional shape,
a thickness of one of the panels is greater than a thickness of the other one of the panels, and
a rear wheel support unit configured to support each rear wheel is coupled to the one of the panels, wherein
the pair of panels include an inner panel and an outer panel facing each other in the vehicle width direction,
a thickness of the outer panel is greater than a thickness of the inner panel,
at the rear portion of the each trailing arm, a top portion of the outer panel is wider in the vehicle width direction than a bottom portion of the outer panel, and
the rear wheel support unit coupled to the each trailing arm is coupled to the outer panel of the each trailing arm.

10. The automobile rear suspension structure according to claim 9, wherein
a closed sectional shape of the rear portion of the each trailing arm is a substantially rectangular shape, and
at the rear portion of the each trailing arm, a bottom portion of the inner panel is wider in the vehicle width direction than a top portion of the inner panel.

11. The automobile rear suspension structure according to claim 10, wherein the rear wheel support unit includes an attachment unit attached to the each rear wheel, and a bracket for supporting the attachment unit on the outer panel, and the bracket is attached over the top portion of the outer panel and an outer portion of the outer panel in the vehicle width direction.

12. The automobile rear suspension structure according to claim 10, wherein the rear portion of the each trailing arm is wider in the vehicle width direction than a front portion of the each trailing arm.

13. The automobile rear suspension structure according to claim 9, wherein the rear portion of the each trailing arm is wider in the vehicle width direction than a front portion of the each trailing arm.

14. An automobile rear suspension structure comprising:

a suspension including a pair of right and left trailing arms extending in a vehicle longitudinal direction and each supporting right and left rear wheels and a torsion beam extending in a vehicle width direction and coupling both trailing arms, wherein each trailing arm includes a pair of panels having U-shaped sections and joined to each other in a state in which U-shaped openings face each other such that a sectional shape of the each trailing arm forms a closed sectional shape, a thickness of one of the panels is greater than a thickness of the other one of the panels, and a rear wheel support unit configured to support each rear wheel is coupled to the one of the panels, the one of the panels forms a portion of a peripheral wall portion including at least an outer top portion in the vehicle width direction in at least the section of a rear portion of each trailing arm, the rear wheel support unit configured to support the each rear wheel is coupled to at least the outer top portion of the peripheral wall portion in the vehicle width direction in the section of the rear portion of the each trailing arm, the pair of panels include an inner panel and an outer panel facing each other in the vehicle width direction, a thickness of the outer panel is greater than a thickness of the inner panel, at the rear portion of the each trailing arm, a top portion of the outer panel is wider in the vehicle width direction than a bottom portion of the outer panel, and the rear wheel support unit coupled to the each trailing arm is coupled to the outer panel of the each trailing arm.

15. The automobile rear suspension structure according to claim 14, wherein a closed sectional shape of the rear portion of the each trailing arm is a substantially rectangular shape, and at the rear portion of the each trailing arm, a bottom portion of the inner panel is wider in the vehicle width direction than a top portion of the inner panel.

16. The automobile rear suspension structure according to claim 15, wherein the rear portion of the each trailing arm is wider in the vehicle width direction than a front portion of the each trailing arm.

17. The automobile rear suspension structure according to claim 15, wherein the rear wheel support unit includes an attachment unit attached to the each rear wheel, and a bracket for supporting the attachment unit on the outer panel, and the bracket is attached over the top portion of the outer panel and an outer portion of the outer panel in the vehicle width direction.

18. The automobile rear suspension structure according to claim 14, wherein the rear portion of the each trailing arm is wider in the vehicle width direction than a front portion of the each trailing arm.

\* \* \* \* \*